(12) United States Patent
Liu et al.

(10) Patent No.: US 10,759,985 B2
(45) Date of Patent: Sep. 1, 2020

(54) HIGH DENSITY AQUEOUS WELL FLUIDS

(71) Applicant: Albemarle Corporation, Baton Rouge, LA (US)

(72) Inventors: Yunqi Liu, Baton Rouge, LA (US); Gregory H. Lambeth, Baton Rouge, LA (US)

(73) Assignee: ALBEMARLE CORPORATION, Charlotte, NC (US)

( * ) Notice: Subject to any disclaimer, the term of this patent is extended or adjusted under 35 U.S.C. 154(b) by 41 days.

(21) Appl. No.: 15/428,653

(22) Filed: Feb. 9, 2017

(65) Prior Publication Data

US 2017/0152427 A1   Jun. 1, 2017

Related U.S. Application Data

(63) Continuation-in-part of application No. PCT/US2015/041662, filed on Jul. 23, 2015.

(60) Provisional application No. 62/423,348, filed on Nov. 17, 2016.

(51) Int. Cl.
C09K 8/05 (2006.01)

(52) U.S. Cl.
CPC ...................... C09K 8/05 (2013.01)

(58) Field of Classification Search
None
See application file for complete search history.

(56) References Cited

U.S. PATENT DOCUMENTS

| | | | |
|---|---|---|---|
| 2,898,294 A | 8/1959 | Priest et al. | |
| 4,248,850 A | 2/1981 | Keblys | |
| 4,304,677 A | 12/1981 | Stauffer et al. | |
| 4,725,372 A | 2/1988 | Teot et al. | |
| 4,728,446 A | 3/1988 | Doty et al. | |
| 5,198,679 A | 3/1993 | Katoh et al. | |
| 5,576,271 A | 11/1996 | Patel | |
| 5,593,650 A | 1/1997 | Prinz et al. | |
| 6,100,222 A * | 8/2000 | Vollmer | C09K 8/08 507/103 |
| 6,632,779 B1 | 10/2003 | Vollmer et al. | |
| 6,730,234 B2 | 5/2004 | Symens et al. | |
| 6,762,154 B2 | 7/2004 | Lungwitz et al. | |
| 6,784,140 B2 | 8/2004 | Kippie et al. | |
| 6,959,767 B2 | 11/2005 | Horton et al. | |
| 7,011,445 B1 | 3/2006 | Hamilton et al. | |
| 7,867,951 B2 | 1/2011 | Knox et al. | |
| 9,650,558 B2 | 5/2017 | Gupta et al. | |
| 2003/0220202 A1 | 11/2003 | Foxenberg et al. | |
| 2005/0101490 A1 | 5/2005 | Vollmer | |
| 2006/0127301 A1 | 6/2006 | Elitzur et al. | |
| 2008/0135302 A1 | 6/2008 | Zhang et al. | |
| 2009/0107671 A1 | 4/2009 | Waters et al. | |
| 2011/0190530 A1 | 8/2011 | Knox | |
| 2013/0178399 A1 | 7/2013 | Falana et al. | |
| 2014/0256602 A1 | 9/2014 | Ravi et al. | |
| 2018/0298266 A1 * | 10/2018 | Marr ........................ C09K 8/05 |

FOREIGN PATENT DOCUMENTS

| | | |
|---|---|---|
| GB | 2408536 B | 2/2006 |
| JP | 04338117 A | 11/1992 |
| RU | 2412958 C2 | 2/2011 |
| RU | 2620672 C2 | 5/2017 |
| WO | 9726311 A1 | 7/1997 |
| WO | 9923188 A1 | 5/1999 |
| WO | 2004050557 A1 | 6/2004 |
| WO | 2008157050 A1 | 12/2008 |
| WO | 2016025137 A1 | 2/2016 |
| WO | WO-2016025137 A1 * | 2/2016 ............... C09K 8/05 |

OTHER PUBLICATIONS

Duhlev, R. et al., "Double Salt Formation in MBr2-M' Br2-H20 and MCl2-M'Cl2-H20 Systems (M, M'=Mg, Ca, Mn, Zn, Cd)", Z. anorg. allg. Chem., 1987, 549, pp. 225-232.

Jeu, Stephen J. et al. (2002). "Systematic Approach to Selecting Completion Fluids for Deepwater Subsea Wells Reduces Completion Problems". Paper presented at the AADE Technology Conference, Houston, Texas, Apr. 2-3, 2002, 9 pages.

Jolles, Z.E., ed. (1966). The Metallic Bromides. In "Bromine and its Compounds", pp. 105-146. London: Ernest Benn Limited.

American Petroleum Institute, "Testing of Heavy Brines", Api Recommended Practice 13J, 5th edition, 2014, pp. 9-32.

Author unknown, website page; http://webmineral.com/AtoZ/index.php?st=286&init-P; visited Jan. 19, 2020, 5 pages.

* cited by examiner

*Primary Examiner* — John J Figueroa
(74) *Attorney, Agent, or Firm* — Marcy M. Hoefling; Troy S. Kleckley; Nathan C. Dunn

(57) ABSTRACT

This invention provides zinc-free aqueous brine compositions. These zinc-free aqueous brine compositions have a density of about 14.3 pounds per gallon to about 15.8 pounds per gallon, and a true crystallization temperature of about 20° F. or less, and comprise water and two or more inorganic bromide salts, where the inorganic bromide salts include calcium bromide and cesium bromide. Processes for forming these zinc-free aqueous brine compositions are also provided.

19 Claims, No Drawings

HIGH DENSITY AQUEOUS WELL FLUIDS

REFERENCE TO RELATED APPLICATIONS

This application claims priority of from U.S. Application No. 62/423,348, filed Nov. 17, 2016, and to International Application No. PCT/US2015/041662, filed Jul. 23, 2015, the disclosures of which are incorporated herein by reference.

TECHNICAL FIELD

This invention relates to high density aqueous brines suitable for use as well fluids.

BACKGROUND

Conventional aqueous brine fluids, like calcium bromide, which can have densities up to about 14.2 pounds per gallon (1.70 kg/L), are widely used in oilfield production as clear completion fluids, drilling fluids, packer fluids, and so forth. For some wells, downhole pressures can reach 30,000 psi ($2.1 \times 10^8$ Pa). Such high pressures occur downhole at least in the Gulf of Mexico, and temperatures at the mud line in the Gulf of Mexico can reach 40° F. (4.4° C.). As a general observation, each 10,000 pounds per square inch ($6.9 \times 10^7$ Pa) increase in pressure can increase the crystallization temperature of an aqueous brine by about ten Fahrenheit degrees (about 5.6 Celsius degrees).

Typical aqueous brine fluids include calcium bromide having densities up to about 14.2 ppg (1.70 kg/L). A calcium bromide aqueous brine of about 14.2 ppg (1.70 kg/L) density has a true crystallization temperature of less than 10° F. (−12.2° C.). Calcium bromide aqueous brines having densities as high as 15 ppg (1.8 kg/L) can be made; however, these solutions have a true crystallization temperature of about 61° F. (16.1° C.). These higher density calcium bromide aqueous brines are not suitable for use in some downhole applications, such as conditions often found in the Gulf of Mexico, because precipitates will form in these higher density calcium bromide aqueous brines due to their relatively high true crystallization temperatures.

Zinc-containing calcium bromide aqueous brines of high density, e.g., about 14.5 pounds per gallon (1.74 kg/L) or greater, are easily obtained by blending enough zinc bromide into the calcium bromide aqueous brine to reach the desired density value. Zinc-containing calcium bromide aqueous brines have true crystallization temperatures that are usually about 20° F. (−6.7° C.) or lower, making these zinc-containing brines more suitable for downhole use. However, inclusion of zinc necessitates increased reporting to government agencies for environmental reasons, resulting in more costly environmental mitigation measures. For example, zinc is regulated as a Priority Pollutant by the United States Environmental Protection Agency (EPA).

Hence, there is a need to develop high density aqueous brine fluids that are zinc-free, and that have true crystallization temperatures that are suitably low for downhole use.

SUMMARY OF THE INVENTION

This invention provides aqueous brines of high density and low crystallization temperature that are zinc-free. It has been discovered, for example, that a high density, zinc-free aqueous brine can be prepared from a combination of water and two or more inorganic bromide salts where the inorganic bromide salts include calcium bromide and cesium bromide. Such brines can exhibit densities of about 15.0 ppg (1.80 kg/L) or greater, and have crystallization temperatures of about 20° F. (−6.7° C.) or less, often about 15° F. (−9.4° C.) or less. These brines are suitable for use as wellbore fluids, such as completion fluids, especially clear completion fluids, drilling fluids, packer fluids, workover fluids, and other fluids that employ aqueous brines, particularly aqueous brines of high density. The aqueous brines of this invention are well suited for offshore completion activities involving high pressure reservoirs, such as oil and gas fields located in the Gulf of Mexico.

An embodiment of this invention is a zinc-free aqueous brine composition. The composition has a density of about 14.3 pounds per gallon (1.71 kg/L) to about 15.8 pounds per gallon (1.89 kg/L), and a true crystallization temperature of about 20° F. (−6.7° C.) or less, preferably about 15° F. (−9.4° C.) or less, and comprises water, calcium bromide, and cesium bromide. Processes for forming these aqueous brine compositions are also provided.

These and other embodiments and features of this invention will be still further apparent from the ensuing description and appended claims.

FURTHER DETAILED DESCRIPTION OF THE INVENTION

As used throughout this document, the phrase "zinc-free" means that except for adventitious impurities, neither zinc nor zinc compounds are present in, or introduced into, the compositions or processes of this invention. Generally, there is about 25 ppm or less of zinc present in the aqueous brines of this invention.

The term ppm means parts per million (wt/wt), as used throughout this document, unless specifically stated otherwise herein. Throughout this document, both "ppg" and "lb/gal" are abbreviations for pounds per gallon.

The abbreviation "TCT" stands for true crystallization temperature (or true crystallization point) as used throughout this document. True crystallization temperature is the temperature at which precipitate begins to form in the absence of supercooling. A method for determining true crystallization temperature is described hereinbelow.

The phrases "inorganic bromide salt", "inorganic bromide", and "bromide salt" are used interchangeably throughout this document.

Because the compositions of the invention can be used as clear completion fluids, precipitates and/or cloudiness in the aqueous brines of the invention are undesirable. To be suitable for use as well fluids, the aqueous brines of the invention have little or no precipitate formation over time (e.g., about one week) at ambient temperature and pressure (e.g., 17 to 25° C. and 14 to 15 psi) or at elevated temperature (e.g., about 60° C.) and ambient pressure.

The compositions of the invention are aqueous brine solutions comprising one or more inorganic bromide salts other than zinc bromide. Although it is convenient to refer to compounds of bromide salts and to metal cations and bromide anions, the species in the compositions may be complexed with water, or in some other form. Similarly, any other water-soluble inorganic salts which are comprised in the aqueous brine solutions of the invention that are referred to as salts or their respective cations and/or anions may be complexed with water, or in some other form.

In the practice of this invention, the inorganic bromide salts are selected from calcium bromide and cesium bromide. One or more other water-soluble inorganic salts can be used, and preferably are selected from an inorganic bromide salt.

When the inorganic salts of the aqueous brine are comprised only of inorganic bromide salts, the total amount of inorganic bromide salts in the aqueous brine is typically in the range of about 50 wt % to about 60 wt %, relative to the total weight of the composition. Preferred total amounts of inorganic bromide salts are from about 53 wt % to about 58 wt %, relative to the total weight of the composition.

Compositions of the invention have densities of about 14.3 pounds per gallon (1.71 kg/L) to about 15.8 pounds per gallon (1.89 kg/L). Preferably, the compositions have densities of about 14.6 ppg (1.75 kg/L) or more. In some embodiments, the compositions preferably have densities of about 14.8 ppg (1.77 kg/L) or more, or preferably about 15.0 ppg (1.80 kg/L) or more, or more preferably about 15.1 ppg (1.81 kg/L) or more.

Density ranges for the compositions of this invention are preferably about 14.3 ppg (1.71 kg/L) to about 15.8 ppg (1.89 kg/L), more preferably about 14.6 ppg (1.75 kg/L) to about 15.6 ppg (1.87 kg/L). In some embodiments, preferred densities are about 14.8 ppg (1.77 kg/L) to about 15.4 ppg (1.85 kg/L), more preferably about 15.0 ppg (1.80 kg/L) to about 15.6 ppg (1.87 kg/L).

For the compositions of the invention, the true crystallization temperatures are generally about 20° F. (−6.7° C.) or less, preferably about 15° F. (−9.4° C.) or less, more preferably about 10° F. (−12.2° C.) or less, and still more preferably about 5° F. (−15.0° C.) or less.

Aqueous brine compositions of the invention normally have pH values of about 2 or more, preferably about 4 or more, and can range from about 2 to about 10. Preferred pH values are in the range of about 4 to about 8; more preferred are pH values in the range of about 6 to about 8.

As is known in the art, it is often useful to include one or more optional additives in an aqueous brine, and the inclusion of such additives is within the scope of this invention. Optional additives can include, for example, corrosion inhibitors, lubricants, pH control additives, surfactants, and/or solvents.

In some preferred zinc-free aqueous brine compositions of the invention, only water, inorganic bromide salts, one or more other water-soluble inorganic salts, and species derived from these components are present in the composition; in these preferred embodiments, the inorganic bromide salts include calcium bromide and cesium bromide.

In other preferred zinc-free aqueous brine compositions of the invention, only water, inorganic bromide salts, and species derived from these components are present in the composition; the inorganic bromide salts include calcium bromide and cesium bromide.

Preferred compositions of this invention include zinc-free aqueous brines which comprise water, calcium bromide, and cesium bromide; wherein the composition has a density of about 14.3 ppg (1.71 kg/L) or more, preferably about 14.6 ppg (1.75 kg/L) or more, more preferably about 15.0 ppg (1.80 kg/L) or more; and a true crystallization temperature of about 20° F. (−6.7° C.) or less, preferably about 15° F. (−9.4° C.) or less, more preferably about 10° F. (−12.2° C.) or less. In these compositions, the calcium bromide is preferably in an amount of about 45 wt % to about 60 wt %, relative to the total weight of the composition. The cesium bromide in these compositions is preferably in an amount of about 3.0 wt % to about 15 wt %, preferably about 3 wt % to about 12 wt %, relative to the total weight of the composition; preferably, these compositions have a pH in the range of about 4 to about 8, more preferably about 6 to 8.

In a preferred embodiment, the inorganic bromide salts are calcium bromide and cesium bromide, and the composition has a density of about 14.6 ppg (1.75 kg/L) or more and a true crystallization temperature at atmospheric pressure of about 20° F. (−6.7° C.) or less, preferably about 15° F. (−9.4° C.) or less. Particularly preferred are compositions containing calcium bromide and cesium bromide which have densities of about 15 lb/gal (1.8 kg/L) to 15.6 ppg (1.87 kg/L), and true crystallization temperatures at atmospheric pressure of about 15° F. (−9.4° C.) or less, more preferably about 10° F. (−12.2° C.) or less. Preferably, these compositions containing calcium bromide and cesium bromide have pH values in the range of about 4 to 8, more preferably about 6 to 8.

Zinc-free aqueous brines having a density of about 14.3 pounds per gallon (1.71 kg/L) or more and a true crystallization temperature of about 20° F. (−6.7° C.) or less are formed by processes which comprise combining, in any order, components comprising water and two or more inorganic bromide salts, where the inorganic bromide salts include calcium bromide and cesium bromide.

The combining of the water and inorganic bromide salts can be conducted in any manner used to mix inorganic salts and water. Normally and preferably, concentrated solutions of the inorganic salts can be mixed with addition or removal of water to provide the composition desired. Alternatively, the inorganic bromide salts are added to the water. The inorganic bromide salts can be mixed with a portion of water before being combined with each other and, if needed, more water. When co-feeding the components or mixtures thereof, there is no requirement that the feeds be entirely co-extensive in time, and each feed may be interrupted at one or more points during the co-feeding. Another preferred way of operating is to introduce one or more of the inorganic bromide salts as a solid into a preformed aqueous solution of the other inorganic bromide salts(s). A combination of methods can be used as desired.

One or more of the inorganic bromide salts can be formed during the process. Formation of an inorganic bromide salt during the process can be used to form a portion of, or all of, the inorganic bromide salt. When an inorganic bromide salt is formed during the process, it can be formed in water before some or all of any other inorganic bromide(s) are introduced, or, preferably, in an aqueous solution of the other inorganic bromide(s).

An inorganic bromide salt can be formed during the process in various ways. In some embodiments, an inorganic bromide salt can be formed from the metal in elemental form and elemental bromine ($Br_2$), especially where the metal is calcium. In other embodiments, an inorganic bromide salt can be formed from an inorganic oxide and/or hydroxide and a bromide source which is hydrogen bromide and/or elemental bromine. In preferred embodiments, the inorganic bromide salt is formed from (i) an inorganic oxide and/or hydroxide and (ii) hydrogen bromide and/or bromine.

Inorganic oxides and/or hydroxides that can be used to form an inorganic bromide salt during the process include one or more of calcium oxide and/or hydroxide, and cesium oxide and/or hydroxide, or mixtures of any two or more of the foregoing.

When one or more inorganic oxides and/or hydroxides are used, the bromide source for forming an inorganic bromide during the process is hydrogen bromide, bromine, or a mixture thereof. Preferably, the bromide source is hydrogen bromide or a mixture of hydrogen bromide and bromine; more preferred is a mixture of hydrogen bromide and bromine. In these mixtures, the hydrogen bromide and bromine can be in any desired proportions from 100% hydrogen bromide to 100% $Br_2$, or at any relative proportion therebetween. For convenience, it may be preferable to employ a mixture in which hydrogen bromide is present. When bromine (elemental bromine, $Br_2$) is used, either alone or in admixture with hydrogen bromide, a reducing agent is also present, and is typically methanol, ethanol, formic acid, hydrazine, and the like.

When forming a zinc-free aqueous brine of the invention, the calcium bromide is typically in an amount in the range of about 45 wt % to about 60 wt %, preferably about 45 wt % to about 55 wt %, relative to the total weight of the aqueous brine composition being formed. Preferred amounts of cesium bromide in the aqueous brine are from about 3 wt % to about 15 wt %; more preferably about 3 wt % to about 12 wt %, relative to the total weight of the composition.

When an inorganic bromide salt is formed during the process, the amount of that inorganic bromide salt is calculated as if the inorganic bromide salt had been added. Amounts of inorganic bromide salt will vary, depending to some extent on the amount(s) of other inorganic bromide(s), because less inorganic bromide salt is needed to reach a particular density value as the amount of other inorganic bromide salt(s) increases.

The amount of water and/or the inorganic bromide salts used to form the aqueous brines of the invention can be adjusted to reach the desired density. Removal of water, for example by heating and/or applying a vacuum, can be employed to reach the desired density for the zinc-free aqueous brine composition.

The zinc-free aqueous brine can be heated during combination of the components and/or after the components are combined, to ensure dissolution of the components. In this optional heating step, the mixture being formed during the process and/or the aqueous brine formed by the process is heated at a temperature of about 40° C. or above to form a heated solution. Elevated temperatures can increase the rate of dissolution of the inorganic bromide salt(s). Such elevated temperatures for heating the aqueous brine are typically in the range of about 40° C. up to the boiling point of the mixture, preferably about 45° C. to about 100° C., more preferably about 50° C. to about 95° C., and still more preferably about 60° C. to about 95° C. In some embodiments, it is preferred to operate under increased pressure, typically about 20 psi to about 40 psi ($1.4 \times 10^5$ to $2.77 \times 10^5$ Pa), because higher temperatures can be achieved. Upon cooling the aqueous brine to ambient temperatures (typically about 15° C. to about 25° C., often about 17° C. to about 23° C.), the inorganic bromide salt(s) usually remain dissolved.

Optionally, the pH of the zinc-free aqueous brine can be adjusted by adding an acid or a base as needed. Suitable acids include mineral acids and water-soluble organic acids; suitable bases are usually inorganic oxides and/or hydroxides. In some instances, upon introduction of an inorganic oxide and/or hydroxide to the zinc-free aqueous brine, a precipitate may form; after filtration, a clear aqueous brine is obtained.

For pH adjustment, suitable inorganic oxides and hydroxides which include oxides and hydroxides of calcium and cesium, alkali metals including lithium, sodium, and potassium, alkaline earth metals, and mixtures of any of these oxides and/or hydroxides, may be used. Preferred inorganic oxides and hydroxides include those of calcium and cesium. In some preferred embodiments, the inorganic oxide(s) and/or hydroxide(s) has one or more of the same cations already present in the aqueous brine. In some embodiments, a small amount of precipitate forms when an inorganic oxide and/or hydroxide is used to increase the pH. Once the precipitate has been removed, e.g., by filtration, additional precipitate formation usually does not occur.

Acids suitable for pH adjustment include mineral acids and organic acids that are water-soluble. Suitable mineral acids include hydrogen chloride, hydrogen bromide, hydrogen iodide, nitric acid, sulfuric acid, phosphoric acid, and the like. Suitable organic acids include formic acid, tartaric acid, citric acid, gluconic acid, lactic acid, malic acid, maleic acid, malonic acid, oxalic acid, and the like. Mixtures of any two or more acids can be employed if desired. Hydrogen bromide is a preferred acid, and can be used in gaseous form, or, preferably, as an aqueous solution.

Any optional additives that are included in the aqueous brines can be introduced in any of the ways that the inorganic bromide salts are introduced, or in any other convenient manner.

Under storage conditions, aqueous brines having a density of about 15.0 ppg (1.80 kg/L) or greater often form a precipitate. Stabilization of these dense aqueous brines can be achieved by adjusting the pH of the aqueous brine. Adjustment of the pH value is accomplished by adding an inorganic hydroxide and/or oxide and/or by adding an acid, preferably hydrogen bromide, usually to a value in the range of about −2 to about 10, more preferably about 4 to about 8; still more preferably about 6 to about 8.

It has been discovered that decreasing the pH of the aqueous brine compositions may minimize or prevent further precipitate formation in the aqueous brine. In such instances, the pH can be adjusted as described above.

In some preferred processes of this invention, only water and the two or more inorganic bromide salts are combined to form the zinc-free aqueous brines of this invention.

In some preferred processes of this invention, only water, inorganic bromide salts, inorganic oxides and/or hydroxides, and/or hydrogen bromide and/or bromine are combined to form the zinc-free aqueous brines of this invention.

Preferred processes of this invention comprise combining, in any order, components comprising water and two or more inorganic bromide salts which include calcium bromide and cesium bromide.

The composition formed has a density of about 14.3 ppg (1.71 kg/L) to about 15.8 ppg (1.89 kg/L), preferably of about 14.6 ppg (1.75 kg/L) or more; and a true crystallization temperature of about 20° F. (−6.7° C.) or less, preferably about 15° F. (−9.4° C.) or less. In some embodiments, the compositions formed preferably have densities of about 14.8 ppg (1.77 kg/L) or more, or preferably about 15.0 ppg (1.80 kg/L) or more, or more preferably about 15.1 ppg (1.81 kg/L) or more. The cesium bromide salt is usually in an amount of about 3.0 wt % to about 15 wt %, preferably about 3 wt % to about 12 wt %, relative to the total weight of the composition formed.

In some preferred processes, the water and inorganic bromide salts are combined to form an aqueous solution. In other preferred processes, one or more inorganic bromide salts are formed during the process from hydrogen bromide and/or bromine and an inorganic oxide and/or hydroxide. The inorganic oxide and/or hydroxide is preferably selected from oxides and/or hydroxides of calcium and cesium, and mixtures of any two or more of the foregoing.

Optionally, the processes further comprise heating the aqueous brine during and/or after combining the components; temperatures and preferences therefor are as described above.

These preferred processes can further comprise adjusting the pH to a value in the range of about 4 to about 8 by adding an acid and/or an inorganic oxide and/or hydroxide to the aqueous brine composition; preferably, the inorganic oxide and/or hydroxide is an oxide and/or hydroxide of calcium and/or cesium, or mixtures of any two or more of these. Preferred pH ranges are as described above.

The following examples are presented for purposes of illustration, and are not intended to impose limitations on the scope of this invention.

In the following Examples, the densities of the solutions were determined by the oscillating U-tube technique, which measures the frequency of the oscillation of the liquid sample, unless otherwise specified.

In an alternate density determination procedure, the densities were measured with calibrated graduated cylinders. In this method, a 50 mL graduated cylinder was calibrated using 30.000 g of deionized water. The volume (for example, 29.7 mL) was recorded to calibrate the scale on the graduated cylinder. Each fluid sample was weighed, and the density was calculated by using the following formula: density (g/mL)=mass (g)/volume (mL), for example, mass (g)/29.7 mL. For smaller sample sizes, a 10 mL graduated cylinder was calibrated and used in the same manner to determine the densities.

True crystallization temperature determinations in the Examples were determined by one of the two the procedures described here.

Classical Procedure.

A jacketed glass tube containing 50 mL of sample was mechanically stirred while being cooled using a recirculating bath containing a cooling fluid (for example, glycol). When the sample reached a temperature about 10° C. above the expected first crystal to appear (FCTA) temperature, the sample was cooled at a rate of approximately 0.5° C./min. or a smaller temperature increment until the TCT (true crystallization temperature) is observed. The FCTA temperature was recorded at the lowest temperature reached before precipitation, and the TCT was recorded at the highest temperature achieved immediately after precipitation started. The sample was removed from the recirculating bath and warmed; when all of the precipitate had disappeared, the last crystal to dissolve (LCTD) temperature was recorded. Each determination was run with a seed crystal of silica (≤50 µm, ~0.03 g) in the sample.

Instrument Procedure.

A sample cup containing 0.25 mL of the sample was placed in a Cloud, Pour, and Freeze Point Lab Analyzer (model no. 70Xi; Phase Technology, Richmond, Canada), and the sample was cooled at 0.5 degrees Celsius per minute until freezing was detected by diffusive light-scattering.

Comparative Example 1

Measurements of the true crystallization temperature (TCT) were made on three samples of calcium bromide aqueous solutions. These samples contained only water and calcium bromide. Results are summarized in Table 1 below.

Comparative Example 2

Two samples were prepared starting from 50.0 g of an aqueous $CaBr_2$ solution having a density of 14.2 ppg (1.70 kg/L). To one sample more $CaBr_2$ (4.32 g) was added; to the other sample, $ZnBr_2$ (3.19 g) was added. Results are summarized in Table 1 below.

Comparative Example 3

Two samples were prepared starting from 40.0 g of an aqueous $CaBr_2$ solution having a density of 12.8 ppg (1.53 kg/L). To one sample more $CaBr_2$ (13.18 g) was added; to the other sample, $ZnBr_2$ (11.90 g) was added. Results are summarized in Table 1 below.

Comparative Example 4

A series of samples was prepared starting from 50.0 g of an aqueous $CaBr_2$ solution having a density of 14.2 ppg (1.70 kg/L). The salts LiBr (4.18 g), $SrBr_2.6H_2O$ (7.01 g), and $BaBr_2$ (2.21 g) were added to separate $CaBr_2$ solutions. Testing of the strontium-containing and barium-containing samples was discontinued due to solubility and density issues.

Another series of samples was prepared, starting from 40.0 g of an aqueous $CaBr_2$ solution having a density of 12.8 ppg (1.53 kg/L). The salts LiBr (15.18 g), and $MgBr_2.6H_2O$ were added to separate $CaBr_2$ solutions. Testing of the magnesium-containing sample was discontinued due to solubility and density issues. Results are summarized in Table 1 below.

TABLE 1

| Compar. Ex. | Run | Inorganic bromides | Non-$CaBr_2$ bromide amount[a] | Total bromide amount[a] | Density | TCT[b] |
|---|---|---|---|---|---|---|
| 1 | a | $CaBr_2$ | none | 56.3 wt % | 14.76 ppg (1.769 kg/L) | 35.6° F. (2.0° C.) |
|  | b | $CaBr_2$ | none | 56.0 wt % | 14.68 ppg (1.759 kg/L) | 32.9° F. (0.5° C.) |
|  | c | $CaBr_2$ | none | 55.4 wt % | 14.58 ppg (1.747 kg/L) | 24.8° F. (−4.0° C.) |
| 2 | a | $CaBr_2$ | none | 56.9 wt % | 14.54 ppg (1.742 kg/L) | 22.1° F. (−5.5° C.) |
|  | b | $CaBr_2$, $ZnBr_2$ | 6.0 wt % | 56.0 wt % | 14.57 ppg (1.746 kg/L) | <−5.8° F. (<−21.0° C.) |
| 3 | a | $CaBr_2$ | none | 58.5 wt % | 14.63 ppg (1.753 kg/L) | 26.6° F. (−3.0° C.) |
|  | b | $CaBr_2$, $ZnBr_2$ | 22.9 wt % | 57.5 wt % | 14.67 ppg (1.757 kg/L) | <−5.8° F. (<−21.0° C.) |
| 4 | a | $CaBr_2$, LiBr | 7.7 wt % | 56.8 wt % | 14.55 ppg (1.743 kg/L) | 33.8° F. (1.0° C.) |

TABLE 1-continued

| Compar. Ex. | Run | Inorganic bromides | Non-CaBr$_2$ bromide amount[a] | Total bromide amount[a] | Density | TCT[b] |
|---|---|---|---|---|---|---|
| | b | CaBr$_2$, LiBr | 27.5 wt % | 66.1 wt % | 14.60 ppg (1.749 kg/L) | 39.2° F. (4.0° C.) |

[a]Relative to total weight of solution.
[b]True crystallization temperature; determined by the classical procedure.

Example 1

Several separate samples were prepared starting from aqueous solutions of CaBr$_2$ having a density of 14.2 ppg (1.70 kg/L) by adding an amount of CsBr to the CaBr$_2$ solutions; clear colorless solutions were formed. A portion of each of some of the samples was placed in a freezer at −16° C. for one week. Two of the samples were then analyzed to determine their density and true crystallization temperature (TCT), which were below −20° C. The TCT values were determined by the instrument procedure described above. Results are summarized in Table 2 below.

TABLE 2

| Run | CaBr$_2$ amount[a] | CsBr amount[a] | Total bromide amount[a] | Density | Soln. remained clear at −16° C. | TCT[b] |
|---|---|---|---|---|---|---|
| 1 | 47.6 wt % | 10.5 wt % | 58.1 wt % | 15.2 ppg (1.825 kg/L) | at least one week | — |
| 2 | 47.6 wt % | 10.5 wt % | 58.1 wt % | 15.2 ppg (1.825 kg/L) | — | <−21.3° C. |
| 3 | 46.4 wt % | 12.8 wt % | 59.2 wt % | 15.4 ppg (1.85 kg/L) | at least one week | — |
| 4 | 45.2 wt % | 15.0 wt % | 60.2 wt % | 15.6 ppg (1.87 kg/L) | at least one week | — |
| 5 | 45.2 wt % | 15.0 wt % | 60.2 wt % | 15.6 ppg (1.87 kg/L) | — | <−22.5° C. |
| C1[c] | 44.0 wt % | 17.2 wt % | 61.2 wt % | 15.9 ppg (1.90 kg/L) | no | — |
| C2[c] | 42.4 wt % | 20.4 wt % | 62.8 wt % | 16.2 ppg (1.94 kg/L) | no | — |

[a]Relative to total weight of solution.
[b]True crystallization temperature; determined by the classical procedure.
[c]Comparative run.

Example 2

Several separate samples were prepared by adding CsBr to aqueous solutions of CaBr$_2$ having a density of 14.2 ppg (Runs A, C, and E; 1.70 kg/L) or of 14.4 ppg (Runs B and D; 1.73 kg/L). The density and the temperatures for the, first crystal to appear (FCTA) and last crystal to dissolve (LCTD) were determined for each solution. The FCTA and LCTD were determined as described above in the classical TCT procedure. Results are summarized in Table 3 below.

TABLE 3

| Run | CaBr$_2$ amount[a] | CsBr amount[a] | Total bromide amount[a] | Density | FCTA | LCTD |
|---|---|---|---|---|---|---|
| A | 50.1 wt % | 4.0 wt % | 54.1 wt % | 14.6 ppg (1.75 kg/L) | 0° F. (−17.8° C.) | 2° F. (−16.7° C.) |
| B | 50.8 wt % | 4.0 wt % | 54.8 wt % | 14.75 ppg (1.7695 kg/L) | 12.7° F. (−10.7° C.) | 14.5° F. (−9.7° C.) |
| C | 49.1 wt % | 5.9 wt % | 55.0 wt % | 14.8 ppg (1.77 kg/L) | <0° F. (−17.8° C.) | <0° F. (−17.8° C.) |
| D | 49.7 wt % | 6.0 wt % | 55.7 wt % | 14.9 ppg (1.79 kg/L) | 11.3° F. (−11.5° C.) | 12.9° F. (−10.6° C.) |
| E | 48.0 wt % | 8.0 wt % | 56.0 wt % | 15.1 ppg (1.80 kg/L) | <0° F. (−17.8° C.) | <0° F. (−17.8° C.) |

[a]Relative to total weight of solution.

Further embodiments of this invention include, without limitation:

A) A composition which is a zinc-free aqueous brine having a density of about 14.3 pounds per gallon to about 15.8 pounds per gallon, and a true crystallization temperature of about 20° F. or less, which composition comprises water and two or more inorganic bromide salts, where the inorganic bromide salts include calcium bromide and cesium bromide.

B) A composition as in A) which has a density of about 14.6 pounds per gallon or more.

C) A composition as in B) wherein the inorganic bromide salts are in a total amount of about 50 wt % to about 60 wt %, relative to the total weight of the composition.

D) A composition as in any of A) to C) wherein the calcium bromide is in an amount of about 45 wt % to about 60 wt % relative to the total weight of the composition.

E) A composition as in any of A) to C) wherein the cesium bromide is in an amount of about 3.0 wt % to about 15 wt % relative to the total weight of the composition.

F) A composition as in any of A) to C) wherein the composition has a pH in the range of about 2 to about 10.

G) A composition as in A) wherein the composition has a density of about 14.6 ppg or more, and a pH value in the range of about 4 to about 8.

H) A composition as in any of A)-H) wherein the composition has a true crystallization temperature of about 15° F. or less.

I) A process for forming a zinc-free aqueous brine composition having a density of about 14.3 pounds per gallon to about 15.8 pound per gallon, and a true crystallization temperature of about 20° F. or less, which process comprises combining, in any order, components comprising water and two or more inorganic bromide salts, where the inorganic bromide salts include calcium bromide and cesium bromide.

J) A process as in I) wherein the composition formed has a density of about 14.6 pounds per gallon or more, and/or wherein the inorganic bromide salts are in a total amount of about 50 wt % to about 60 wt %, relative to the total weight of the composition.

K) A process as in I) wherein the composition formed has calcium bromide in an amount of about 45 wt % to about 60 wt % relative to the total weight of the composition.

L) A process as in I) wherein the composition formed has cesium bromide in an amount of about 3.0 wt % to about 15 wt % relative to the total weight of the composition.

M) A process as in any of I) to L) wherein the composition formed has a pH, the process further comprising adjusting the pH to a value in the range of about 2 to about 10 by adding an inorganic oxide and/or hydroxide, and/or by adding an acid.

N) A process as in any of I) to M) which further comprises heating during and/or after the combining.

O) A process as in any of I)-N) wherein the composition formed has a true crystallization temperature of about 15° F. or less.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation in its practice. Therefore the foregoing description is not intended to limit, and should not be construed as limiting, the invention to the particular exemplifications presented hereinabove.

That which is claimed is:

1. A composition which is a zinc-free aqueous brine having a density of about 14.3 pounds per gallon to about 15.8 pounds per gallon, and a true crystallization temperature of about 20° F. or less, which composition comprises water and two or more inorganic bromide salts, where the inorganic bromide salts include calcium bromide and cesium bromide.

2. A composition as in claim 1 which has a density of about 14.6 pounds per gallon or more.

3. A composition as in claim 2 wherein the inorganic bromide salts are in a total amount of about 50 wt % to about 60 wt %, relative to the total weight of the composition.

4. A composition as in claim 1 wherein the calcium bromide is in an amount of about 45 wt % to about 60 wt % relative to the total weight of the composition.

5. A composition as in claim 1 wherein the cesium bromide is in an amount of about 3.0 wt % to about 15 wt % relative to the total weight of the composition.

6. A composition as in claim 1 wherein the composition has a pH in the range of about 2 to about 10.

7. A composition as in claim 1 wherein the composition has a density of about 14.6 pounds per gallon or more, and a pH value in the range of about 4 to about 8.

8. A composition as in claim 1 wherein the composition has a true crystallization temperature of about 15° F. or less.

9. A process for forming a zinc-free aqueous brine composition having a density of about 14.3 pounds per gallon to about 15.8 pounds per gallon, and a true crystallization temperature of about 20° F. or less, which process comprises combining, in any order, components comprising water and two or more inorganic bromide salts, where the inorganic bromide salts include calcium bromide and cesium bromide.

10. A process as in claim 9 wherein the composition formed has a density of about 14.6 pounds per gallon or more, and/or wherein the inorganic bromide salts are in a total amount of about 50 wt % to about 60 wt %, relative to the total weight of the composition.

11. A process as in claim 9 wherein the composition formed has calcium bromide in an amount of about 45 wt % to about 60 wt % relative to the total weight of the composition.

12. A process as in claim 9 wherein the composition formed has cesium bromide in an amount of about 3.0 wt % to about 15 wt % relative to the total weight of the composition.

13. A process as in claim 9 wherein the composition formed has a pH, the process further comprising adjusting the pH to a value in the range of about 2 to about 10 by adding an inorganic oxide and/or hydroxide, and/or by adding an acid.

14. A process as in claim 9 which further comprises heating during and/or after the combining.

15. A process as in claim 9 wherein the composition formed has a true crystallization temperature of about 15° F. or less.

16. A method of treating a wellbore, said method comprising: introducing into the wellbore a fluid which is a zinc-free aqueous brine having a density of about 14.3 pounds per gallon to about 15.8 pounds per gallon, and a true crystallization temperature of about 20° F. or less, which fluid comprises water and two or more inorganic bromide salts, where the inorganic bromide salts include calcium bromide and cesium bromide.

17. A method as in claim 16 wherein the fluid is a completion fluid, drilling fluid, packer fluid, or workover fluid.

18. A method as in claim 16 wherein the fluid is a clear completion fluid.

19. A method as in claim 16 wherein the wellbore is connected to a high pressure reservoir.

* * * * *